United States Patent [19]
Meier

[11] Patent Number: 6,088,083
[45] Date of Patent: Jul. 11, 2000

[54] OPTICAL IMAGE RECORDING ARRANGEMENT AND METHOD OF USING THE SAME

[75] Inventor: Hans-Jürgen Meier, Aalen, Germany

[73] Assignee: Carl-Zeiss-Stiftung, Heidenheim, Germany

[21] Appl. No.: 09/175,429

[22] Filed: Oct. 20, 1998

[30] Foreign Application Priority Data

Oct. 22, 1997 [DE] Germany .......................... 197 46 575

[51] Int. Cl.[7] .......................... G03B 27/54; G01B 11/00; G02B 7/04
[52] U.S. Cl. .......................... 355/67; 356/400; 250/201.3
[58] Field of Search .................. 355/44, 45, 55, 355/56, 67, 71, 53.2, 53.22; 356/399, 400; 250/201.3, 201.5, 201.4; 348/79, 80; 359/368–383, 618, 619, 620, 630, 626, 627

[56] References Cited

U.S. PATENT DOCUMENTS

| | | | |
|---|---|---|---|
| 3,883,689 | 5/1975 | Mansour et al. | 348/350 |
| 4,614,864 | 9/1986 | Wu | 250/201.4 |
| 4,795,260 | 1/1989 | Schuur et al. | 356/400 |
| 4,943,733 | 7/1990 | Mori et al. | 250/548 |
| 5,483,079 | 1/1996 | Yonezawa | 250/559.29 |
| 5,594,587 | 1/1997 | Komatsuda et al. | 359/619 |
| 5,604,344 | 2/1997 | Finarov | 250/201.3 |
| 5,745,800 | 4/1998 | Kanbara et al. | 396/55 |
| 5,747,202 | 5/1998 | Tanaka | 430/30 |
| 5,936,712 | 8/1999 | Ito et al. | 355/55 |

*Primary Examiner*—Alan A. Mathews
*Assistant Examiner*—Rodney Fuller
*Attorney, Agent, or Firm*—Walter Ottesen

[57] ABSTRACT

The invention is directed to an optical image recording arrangement of a three-dimensional object wherein an illuminating raster generator simultaneously generates a plurality of separate light spots in a first focal plane. The light spots in the first focal plane are imaged by optical elements into a second focal plane on the three-dimensional object. The image of the light spots is imaged by optical elements onto a first detector device having several detector elements. A displacing device is mounted in the beam path of the illuminating raster generator. The displacing device effects at least a two-axis position change of the first focal plane. The method of the invention determines the sharply imaged regions of a three-dimensional object in an optical image recording arrangement. An illuminating raster generator in the image recording arrangement simultaneously generates a plurality of separate light spots in a first focal plane. The light spots in the first focal plane are imaged by optical elements into a second focal plane on the three-dimensional object. The image of the light spots is imaged by optical elements onto a first detector device having several detector elements and the image of the object is recorded by a second detector device. A correlation of the images of both detector devices is made.

26 Claims, 1 Drawing Sheet

OPTICAL IMAGE RECORDING ARRANGEMENT AND METHOD OF USING THE SAME

FIELD OF THE INVENTION

The invention relates to an optical image recording arrangement for a three-dimensional object wherein an illuminating raster generator generates a plurality of separate light spots in a first focal plane. The light spots are imaged via optical elements into a second focal plane on the three-dimensional object and the image of the light spots is imaged via optical elements onto a first detector unit having several detector elements. The invention also relates to an image recording method which can be advantageously used with this optical image recording arrangement.

BACKGROUND OF THE INVENTION

Most focus sensor systems utilize effects for which the back-reflected energies in two different channels are compared to each other in order to generate the focusing signal. This leads to the disadvantage that fluctuations in intensity in one of the channels erroneously simulate a focus shift and lead to an unwanted reaction of the system. The control loops in the known systems operate mostly in a purely analog manner and are therefore very prone to disturbances.

Focus systems can image only a single plane very sharply whereas, most viewed objects should be focused differently at various locations of the image field.

SUMMARY OF THE INVENTION

It is the object of the invention to provide an optical image recording arrangement (especially for focus detection) which exhibits no focus shift.

The optical image recording arrangement of the invention of a three-dimensional object includes an illuminating raster generator which generates a plurality of separate light spots simultaneously in a first focal plane. These light spots in the first focal plane are imaged via optical elements into a second focal plane on the three-dimensional object and the image of the light spots is imaged via optical elements on a first detector device having several detector elements.

According to the invention, the optical image recording arrangement includes a displacing device in the beam path of the illuminating raster generator which can effect at least a two-axis tilting (position change) of the first focal plane.

Preferably, the illuminating raster generator comprises a two-dimensional arrangement of several lenses.

It is advantageous when the light of the light source of the illuminating raster generator is monochromatic light because this light can then be more easily coupled out of the beam path.

Preferably, the displacing device is mounted on the illuminating raster generator whereby only small tilt angles have to be realized.

The displacing device is preferably made up of three displacing elements which are mounted on a circle at at least an approximately uniform spacing. This permits the adjustment of each desired tilt direction and its magnitude.

The actuating elements have to overcome only short paths so that especially piezo-actuators can be used.

A rapid evaluation is obtained when the first detector device detects in two dimensions on a surface so that no scanning operation need be carried out.

A rapid data recording is ensured with the use of a CCD-array sensor as the first detector device.

An in-coupling device should be mounted in the illuminating beam path which couples the light spot raster into the illuminating beam path. In this way, a compact configuration of the focus sensor is made possible.

Furthermore, an out-coupling unit should be mounted in the illuminating beam path which images the image of the light spot raster onto a second detector device (used exclusively for the focusing arrangement).

For a rapid processing of the output signals generated by the detector devices, it is advantageous when at least one of the two detector devices is connected to an evaluation device.

For image recording, a wideband illumination should preferably be provided in the image recording arrangement.

Preferably, the wideband illumination and the light spot raster utilize the same illuminating beam path whereby the dimensions of the apparatus can be held small.

A z-movement unit, which acts on the objective or on the object, makes possible the rapid recordation of sharp images of three-dimensional objects.

Here, the displacing elements should be able to execute a z-movement simultaneously to readjusting the lens plate relative to the object.

The optical imaging recording arrangement of the invention can be especially advantageously utilized when the object is a wafer which is used to manufacture semiconductor chips.

The method of the invention is for determining the sharply imaged regions of an optical image recording arrangement of a three-dimensional object. This method utilizes an illuminating raster generator in the image recording arrangement which generates a plurality of separate light spots simultaneously in a first focal plane. These light spots in the first focal plane are imaged by optical elements into a second image plane on the three-dimensional object and the image of the light spots is imaged by optical elements onto a first detector device having several detector elements. In addition, the image of the object is recorded by a second detector device.

According to a feature of the invention, a correlation of the images of the two detector devices takes place. Here, the image recording of the object and the detection of the focus position take place simultaneously.

Preferably, the light spot raster determines the sharp regions of the image.

Preferably, in a first position (1), a selection of the component regions of an image to be recorded takes place; then (2), the light spot raster is switched off whereupon a component image recording takes place; and, then (3), at least a movement of the object from the first position into another position takes place. After each position change, the steps (1) to (3) are repeated.

Furthermore, and via the inclined position of the light spots in the first focal plane, a detection of the object depth takes place and then, the actual image recording takes place after the light spots are adjusted upright in the first focal plane.

BRIEF DESCRIPTION OF THE DRAWINGS

The invention will now be described with reference to the drawing wherein the single figure (FIG. 1) shows an embodiment of the optical image recording arrangement according to the invention.

DESCRIPTION OF THE PREFERRED EMBODIMENTS OF THE INVENTION

Figure 1:
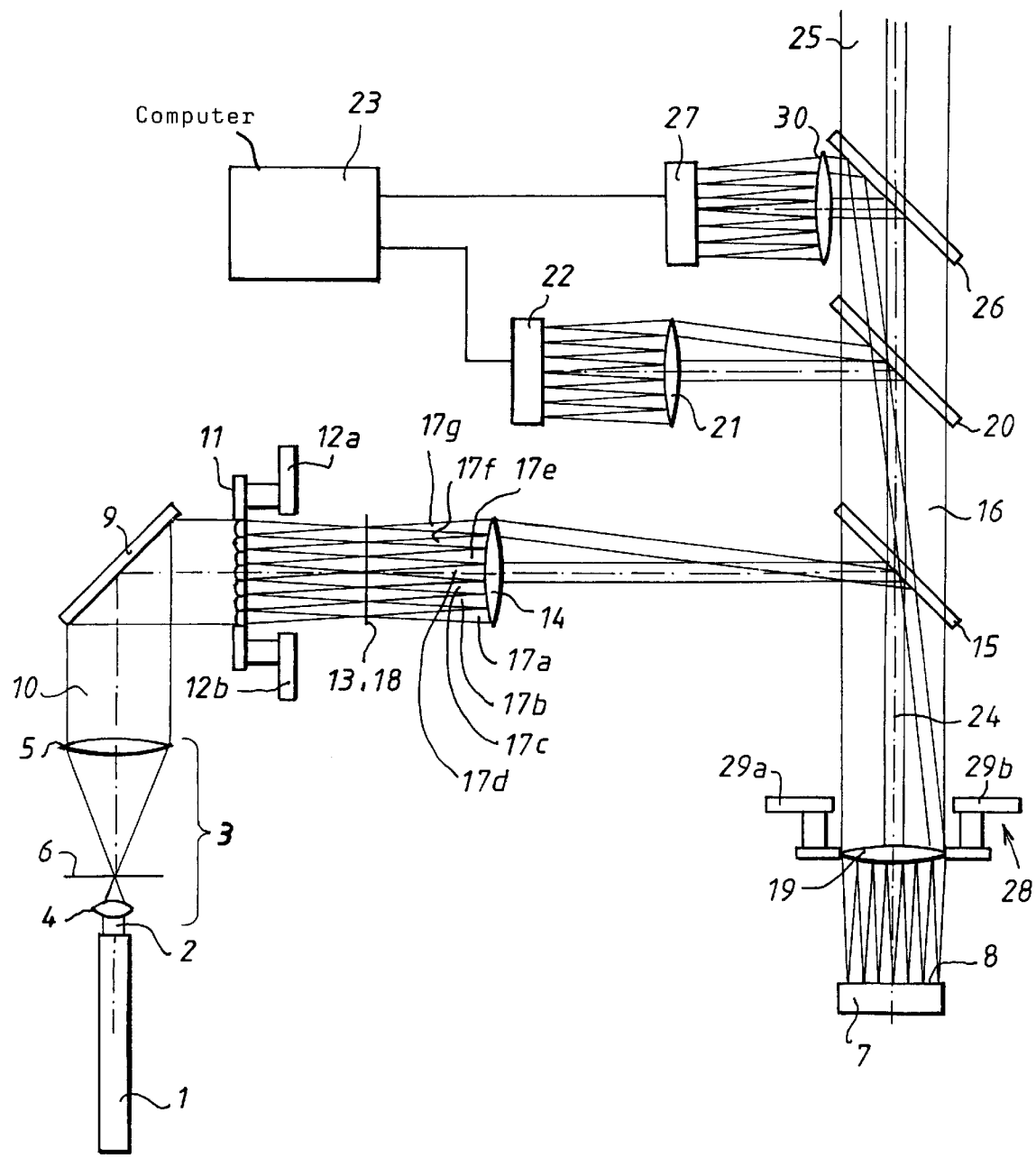

A schematic illustration of the arrangement of the invention can be seen in FIG. 1.

The arrangement of the invention serves as a focus sensor in a microscope and comprises a minimum of optical elements which are so utilized that the location of individual partial images is utilized for measuring the focus and not different intensities. For the focus sensor system, a different wavelength is used than for the imaging in the microscope beam path.

The focus sensor shown in FIG. 1 includes a laser 1 as a light source for the focus sensor or the detector. The light beam 2, which emanates parallelly from the laser 1, is so expanded that the entire desired irradiation surface 8 can be irradiated, in this case, a wafer 7 for manufacturing semiconductor components. The light beam 2 is expanded by means of a beam cross-section magnification device (expander) 3 which has two positive lenses (4, 5) in the illustrated embodiment and between which a pinhole diaphragm 6 is mounted as a divergence filter.

This expanded light beam 10 is then directed to a circular lens array 11 by a mirror 9 mounted at an angle of 45°. The mirror 9 can have another angle for other variations of the invention. The angular position of the lens array 11 relative to the expanded beam 10 can be adjusted by several piezo-actuators (12a, 12b). These piezo-actuators (12a, 12b) are mounted on the lens array 11 and can be arranged so that two are opposite each other, but three piezo-actuators arranged on the periphery are preferable. The beam deflection by mirror 9 ensures a compact configuration of the apparatus.

The focus plane 13 of this microlens array 11 is reflected by an optical system (14, 15) into the viewing beam path 16 of a microscope so that an image of the foci 13 of the array 11 is imaged on the object to be observed. For this purpose, the lens array 11 (microlens plate) divides the beam (17a to 17f) impinging thereon into many smaller beams which are independent of each other. These smaller beams (17a to 17f) have an individual focus which lies in a plane 13 for all beams (17a to 17f). In this plane 13, a further pinhole diaphragm plate 18 is mounted which has respective openings for each of the many beams (17a to 17f). In the normal case, the pinhole diaphragm plate 18 can be omitted. A lens 14 having a positive refractive power is mounted behind the focal plane 13 and the beams (17a to 17f) impinge through this lens onto a first planar plate 15 disposed in the viewing beam path 16. The planar plate 15 has a coating which deflects a portion of the light of the beams (17a to 17f) for the focus sensor onto the irradiation surface 8 of the object 7 to be irradiated.

An objective 19 is disposed forward of the object 7 and has a positive refractive power. The objective 19 focusses the beams (17a to 17f) onto the surface of the object 7 in the region of the radiation surface 8. The beams (17a to 17f) generate a spot on the surface 8 of the workpiece having a magnitude which can be determined by the optical configuration of the arrangement.

When properly focused, the surface of the object 7 acts as a mirror which reflects back the foci 13 of the array 11 into the objective 19. Here, the light, which is reflected from the surface 8 of the object, passes through the objective 19 and the first planar plate 15 onto a second planar plate 20 which directs the light onto an objective 21 having positive refractive power. This second planar plate 20 is configured as a dichroitic divider mirror and the laser light of the foci is again out-coupled by this divider mirror and is imaged via the lens system of the objective 21 onto the CCD-detector 22. The many beams of the spots are directed by this objective 21 onto the photosensitive surface of a CCD-detector 22. This CCD-detector 22 is connected to a computer 23 which evaluates the signals received from the CCD-detector 22 and so generates a measurement signal. The nature and magnitude of this signal is then a measure as to whether the workpiece 7 is disposed in the focus plane of the microscope. When the workpiece 7 is not in the focus plane of the microscope, then either the position of the workpiece 7 is changed in the z-axis or the optical system of the microscope is readjusted.

An image of the foci of the array appears on the CCD array 22 if the object 7 is focused. Otherwise, the individual light spots become blurred.

If the microlens plate 11 is slightly tilted with the aid of the three piezo-actuators (12a, 12b) (12c is not visible in the figure), then its focus plane 13 is also tilted and the image thereof is imaged sharply on the object 7 only for those light points for which the focal position is just right. Accordingly, only a sharp row of image points is seen in the image on the CCD-detector 22 having positions which are a measure for the focus position. The sharp image point line migrates during through focusing across the CCD-detector 22. It is the task of the software in the connected computer 23 to compute the focus position from the positions of the image points and to drive the focus controller.

The tilt angle of the microlens array 11 can be selected as desired. For this reason, the sensitivity of the system can be easily adapted to various magnifications.

For the case that the object plane 8 is not perpendicular to the optical axis 24, the image yields a twisting of the sharply imaged focus points relative to the tilt direction of the microlens plate 11. From this twist angle, the tilt direction and its magnitude can be computed. The tilt direction of the microlens array 11 can be selected in each desired direction. (When both array plate 11 and object 7 are parallel to each other, then, however, no individual focus line is present; instead, there is only a uniform field of all foci).

The advantages of the sensor are, in addition to its digital characteristic, the capability of determining the tilting of the object plane in addition to the focus.

The method described below solves the problem that focus detection systems really image sharply in only a single plane and the method supplies an image which can sharply image all depths of the 3D-object 7 almost simultaneously. This is, however, necessary because most viewed objects 7 have different elevations at various locations of the image field 8 and must therefore be differently focused if one is to obtain a sharp image in the entire image field 8. The normally available depth of field of the microscopes is adequate for this purpose only in the most unusual cases.

In addition to the wideband illumination 25 of the object 7, the image of the above-described microlens array 11, which is illuminated by laser light 2, is imaged on the object 7 (surface of the wafer). The microlens array 11 is aligned precisely parallel to the focus plane of the objective 19 forward of the surface 8 of the workpiece 7. The laser light reflected from the surface 8 of the workpiece 7 is separated dichroitically by a planar plate 20 from the wideband illumination and is directed to a CCD-detector 22.

The image of the surface 8 of the workpiece 7 in the wideband light 25 is likewise imaged onto a CCD-detector 27; however, the objective 19 executes a continuous focus movement about the optimal focal plane (focus dither). For this purpose, a rapid displacing device 28 is mounted on the objective 19 ahead of the surface 8 of the object 7. In the embodiment shown, the displacing device 28 comprises three piezo-actuators (29a to 29c) which are uniformly mounted about the periphery of the objective 19. During the dither movement, individual regions of the image become sharp; whereas, other regions become unsharp. This behavior applies in the same manner for the laser light 2 of the microlens array 11 as for the wideband light 25 of the object 7. An objective 30 is mounted forward of the CCD-detector 27 and sharply images the surface 8 of the object 7 onto the CCD-detector 27.

According to the invention, the utilization of the correlation of the data of the focus sensor with the data of the CCD-detector 27 now takes place for the image recording by means of the wideband illumination 25 to a combination of all sharply imaged points during dither to a single sharp image of the 3D-object 7. For this purpose, and for each individual dither position, only the image data is transmitted whose analog image field zone is recognized as being imaged sharply by the laser light 2. The computer 23 is connected to the CCD-detector 27 for the image recordation as well as to the CCD-detector for the focus detection 22. The evaluation software in the computer 23 is significantly simpler to realize for the sharp regions in the laser light 2 than for the wideband light 25 from the object 7 because the desired form of the sharp image points of the lens array 11 is known.

The advantage of the method is in a direct recording of the wideband light images compared to an evaluation of many wideband light images whereby the data quantity is drastically reduced and the time for image recordation is drastically reduced.

The arrangement shown in the figure serves most importantly as a focus sensor with the microlens array 11 being slightly tilted. In this form, the microlens array 11 can also be used for locating the dither zero position. Accordingly, the CCD-detector 22 can also be used for the 3D-application when the CCD-detector is precisely adjusted parallel to the focal plane with the aid of the piezo-actuators 11.

It is understood that the foregoing description is that of the preferred embodiments of the invention and that various changes and modifications may be made thereto without departing from the spirit and scope of the invention as defined in the appended claims.

What is claimed is:

1. An optical image recording arrangement for recording an image of a three-dimensional object, the arrangement comprising:

an illuminating raster generator defining a beam path and simultaneously generating a plurality of mutually separated light spots in a first focal plane;

a first set of optical elements for imaging said light spots in said first focal plane onto a second focal plane on said three-dimensional object;

a detector device having several detector elements;

a second set of optical elements for imaging the image of said light spots in said second focal plane onto said plurality of detector elements of said detector device; and, a displacing device arranged in said beam path of said illuminating raster generator for effecting at least a two-axis position change of said first focal plane.

2. The optical image recording arrangement of claim 1, wherein said illuminating raster generator is a two-dimensional arrangement of several lenses.

3. The optical image recording arrangement of claim 2, said illuminating raster generator comprising a light source for supplying monochromatic light.

4. The optical image recording arrangement of claim 3, wherein said displacing device is mounted on said illuminating raster generator.

5. The optical image recording arrangement of claim 4, wherein said displacing device comprises three displacing elements which are mounted on a circle.

6. The optical image recording arrangement of claim 5, wherein said displacing elements are piezo-actuators.

7. The optical image recording arrangement of claim 6, wherein said detector device is two-dimensional.

8. The optical image recording arrangement of claim 7, wherein said detector device is a CCD-array sensor.

9. The optical image recording arrangement of claim 8, wherein said light spots in said first focal plane define a light spot raster; said first set of optical components include an objective defining an optical axis along which an illuminating beam is transmitted to said object; and, said first set of optical elements including an in-coupling unit mounted in the path of said illuminating beam for coupling said light spot raster into said illuminating beam path.

10. The optical image recording arrangement of claim 9, said detector device being a first detector device; and, said arrangement further comprising a second detector device; and, an out-coupling unit mounted on said illuminating beam path for imaging the image of said light spot raster onto said second detector device.

11. The optical image recording arrangement of claim 10, wherein said first and second detector devices supply first and second output signals; an evaluation unit is provided for evaluating said output signals; and, at least one of said two detector devices is connected to said evaluation unit for evaluating the output signals.

12. The optical image recording arrangement of claim 11, wherein a wideband illumination device is additionally arranged on said image recording arrangement.

13. The optical image recording arrangement of claim 5, further comprising a source of wideband illumination for transmitting wideband illumination along an illuminating beam path to said object; and, said light spots being arranged in a light spot raster which is imaged along said illuminating beam path.

14. The optical image recording arrangement of claim 13, wherein said first set of optical components includes an objective defining an optical axis along which an illuminating beam is transmitted to said object; and, said arrangement further comprising a z-movement unit for acting on said objective or on the object.

15. The optical image recording arrangement of claim 14, wherein said illuminating raster generator includes a lens plate; and, said displacing elements are provided for adjusting said lens plate relative to said object and are adapted to execute a z-movement.

16. The optical image recording arrangement of claim 14, wherein said object is a wafer on which electronic components are located.

17. A method for determining sharply imaged regions of a three-dimensional object with an optical image recording arrangement wherein the image recording arrangement includes an illuminating raster generator and the method comprising the steps of:

simultaneously generating a plurality of separate light spots in a first focal plane using said illuminating raster generator;

imaging said light spots with optical elements into a second focal plane on the three-dimensional object;

imaging the image of said light spots with optical elements onto a first detector device having several detector elements; and, recording the image of the object with a second detector device; and, correlating the images of said first and second detector devices.

18. The method of claim 17, wherein the light spots define a light spot raster and said light spot raster determines the sharp regions of the image.

19. The method of claim 17, wherein said light spots define a light spot raster; and, said method comprising the further steps of: in a first position of said object, (1) selecting component regions of an image to be recorded via said light spot raster;

(2) thereafter switching the light spot raster off; and, (3) then recording a component image and, after concluding the component image recordation, moving the object from said first position into at least one further position and, after each position change, repeating steps (1) to (3).

20. The method of claim 17, comprising the further steps of: positioning the light spots in the first focal plane in an inclined position; detecting the object depth; and, positioning the light spots to be straight in the first focal plane; and, recording the actual image.

21. An optical image recording arrangement for recording an image of a three-dimensional object, the arrangement comprising:

an illuminating raster generator defining a beam path and simultaneously generating a plurality of mutually separated light spots in a first focal plane;

a first set of optical elements for imaging said light spots in said first focal plane onto a second focal plane on said three-dimensional object;

a detector device having several detector elements;

a second set of optical elements for imaging the image of said light spots in said second focal plane onto said plurality of detector elements of said detector device;

said second set of optical elements including an objective defining an optical axis and wherein said three-dimensional object can be at a tilt relative to said optical axis and said tilt having a direction and a magnitude;

a computer connected to said detector device and functioning to compute said direction and said magnitude; and, a displacing device arranged in said beam path of said illuminating raster generator for effecting at least a two-axis position change of said first focal plane.

22. The optical image recording arrangement of claim 21, wherein said illuminating raster generator is a two-dimensional arrangement of several lenses.

23. The optical image recording arrangement of claim 21, wherein said displacing device comprises three displacing elements which are mounted on a circle with at least approximately uniform spacing.

24. The optical image recording arrangement of claim 21, wherein said detector device is two-dimensional.

25. The optical image recording arrangement of claim 21, further comprising a z-movement unit for acting on said objective or on the object.

26. The optical image recording arrangement of claim 25, wherein said illuminating raster generator includes a lens plate; and, said displacing elements are provided for adjusting said lens plate relative to said object and are adapted to execute a z-movement.

* * * * *